United States Patent
Emmert, Jr. et al.

(10) Patent No.: US 7,036,366 B2
(45) Date of Patent: May 2, 2006

(54) AIR FLOW MEASUREMENT SYSTEM HAVING REDUCED SENSITIVITY TO FLOW FIELD CHANGES

(75) Inventors: Charles G. Emmert, Jr., Grand Blanc, MI (US); Dan H. Emmert, Grand Blanc, MI (US); Edward R. Fizell, Flint, MI (US); Christopher H. Knieper, Chesaning, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/854,133

(22) Filed: May 25, 2004

(65) Prior Publication Data

US 2005/0262937 A1 Dec. 1, 2005

(51) Int. Cl.
*G01F 1/68* (2006.01)
(52) U.S. Cl. .............. 73/202.5; 73/204.21; 73/204.22
(58) Field of Classification Search ............ 73/204.21, 73/204.22, 202.5, 118.2, 861.64, 861.63, 73/861.61, 861.52
See application file for complete search history.

(56) References Cited

U.S. PATENT DOCUMENTS 6,240,775 B1 * 6/2001 Uramachi et al. ....... 73/204.21

\* cited by examiner

*Primary Examiner*—Harshad Patel
(74) *Attorney, Agent, or Firm*—Jimmy L. Funke

(57) ABSTRACT

A system for measuring air flow rate in a duct includes an air flow sensor and an air flow conditioning device for collecting and accelerating a portion of the total air stream to the sensor, which may be means as known in the art. The conditioning device includes two opposed converging walls defining a nozzle, preferably a venturi, the sensor being disposed in the throat of the nozzle. The surfaces of the venturi walls are textured to trip the boundary layer near the wall surface into turbulence to maintain attachment of flowing air to the walls even when the angle of attack of the air is significantly non-axial. The wall texturing may be random or may be an organized pattern. A further embodiment includes a second flow conditioner/sensor in parallel with the first whereby an averaged flow measurement is taken for a more accurate reading.

15 Claims, 12 Drawing Sheets

AIR FLOW MEASUREMENT SYSTEM HAVING REDUCED SENSITIVITY TO FLOW FIELD CHANGES

TECHNICAL FIELD

The present invention relates to systems for measuring the flow velocity, flow volume, or mass flow rate of a gas through a conduit; more particularly, to such systems having convergent walls for forming a laminar flow of gas past a sensor; and most particularly, to such a system having a textured wall surface for creating turbulent flow in the wall boundary layer in the wall-convergence zone to maintain wall contact with gas flows approaching from off-axis directions.

BACKGROUND OF THE INVENTION

Air flow measurement systems incorporating any of various types of sensor elements are well known, for example, a heated wire whose temperature is an inverse function of the velocity of air flowing past the wire. In most air flow measurement devices, the sensor interacts with only an extremely small portion of the total flow field, typically central to the field. It is a well known problem in the design and use of air flow measurement devices that changes in upstream ducting configuration, such as manipulation of an upstream throttle valve, or using a given device in a differently-configured duct or manifold, can alter the flow field around the sensor and thus alter the sensor output non-linearly, i.e., the output signal will contain a degree of error. Therefore, it is known in the art of air flow measurement to provide an air flow conditioning device ahead of the sensor to reduce the degree of error in the sensor output over a desired range of flow measurements.

Many types of air flow conditioning devices exist. Straight sections of pipe tend to allow the flow perturbations to equalize and subside before reaching the sensor. Although simple in concept, the allotted packaging space may prevent the installation of a pipe section of sufficient length; typically, a straight pipe having a length of at least ten diameters should precede the sensor. Tube bundles and honeycomb-shaped bundles can effectively eliminate cross-flow conditions, but they require a means of locating and securing the conditioning device in the upstream duct, and they introduce additional restrictions to flow through greatly increased surface area. These considerations also apply to screens, fins, grids, and various porous media intended for eliminating cross-flow conditions.

Another technique to reduce the sensitivity to upstream flow field variations is to place the sensor at the throat of a nozzle, or venturi. Since the entrance to the venturi covers a larger cross-sectional area of the flow field than does the throat, the venturi effectively samples more of the flow field. It also accelerates the flow of gathered air past the sensor, thereby increasing the gain of the sensor.

As air moves over the surface of the venturi, a boundary layer forms on the walls of the venturi in which the air velocity is zero at the venturi surface and is at the velocity of the main flow at the top of the boundary layer. Beginning at the leading edge of the solid surface, the boundary layer increases in thickness in the direction of air flow. As the boundary layer grows, it acts to reduce the throat area of the venturi, which further accelerates the flow past the sensor.

As much flexibility as possible in the mounting and positioning of air flow measurement systems is preferred. Devices with fewer requirements as to upstream ducting configurations, while still providing the desired measurement accuracy, will have a significant advantage over competing devices having less latitude. Having fewer restrictions as to the upstream ducting configuration means that the flow field presented to the air flow measurement device can exhibit greater variation.

In prior art venturi nozzles, when the flow approaches the surface at a severe off-axis angle such as that caused by a sharp bend in the upstream ducting, the thickness of the boundary layer along the nozzle wall can change abruptly. Such changes result from the transition from laminar to turbulent flow, or even separation of the boundary layer from the surface if the angle of attack is great enough. The flow separates from the nozzle wall at different locations, depending upon the shape and location of the upstream ducting. The thus-modified boundary layer changes the effective area of the nozzle throat, causing the sensor to produce a signal value different than if the same bulk flow rate had a straight-on approach to the venturi.

The location of the separation point depends upon many factors, including flow rate, angle of attack of the air onto the wall, and laminar or turbulent flow. All of these conditions impact the effective throat area of the venturi; hence, the velocity over the sensor will vary with changing upstream conditions even if the actual mass flow rate remains constant, thus generating an erroneous signal.

In the patent literature, US Patent Publication No. US 2001/0037678 discloses a conditioning device having an inlet-side bypass passage containing a venturi-like throttle unit leading to the sensor, whereby the sensor is purported to be isolated from turbulence in the main air flow field. A potential shortcoming of this device is the assumption that flow through the bypass is a constant percentage of the total flow at all flow rates.

US Patent Application Publication No. US 2004/0055570 discloses a conditioning device which essentially divides the air flow approaching a sensor into concentrically central and outer regions, and diverts the outer regions around the sensor, on the assumption that the central region is more laminar and that variations in upstream duct configurations will result in variations in turbulence principally in the outer regions which bypass the sensor.

U.S. Pat. No. 6,267,006 discloses an upstream flow conditioner comprising a conical section leading to a mass flow sensor and having radial fin-like flow conditioning elements (FCEs) which purportedly shape the airflow pattern presented to the mass flow sensor to provide an airflow of uniform velocity with a low magnitude of turbulence fluctuations.

What is needed in the art is an improved air flow measurement device which exhibits a reduced sensitivity to changes in the upstream air flow field.

It is a principal object of the present invention to provide an air flow measurement device which exhibits reduced sensitivity to upstream variations in air flow turbulence.

SUMMARY OF THE INVENTION

Briefly described, an air flow measurement system for measuring air flow rate in a duct includes an air flow sensor and an air flow conditioning device for collecting and accelerating toward the sensor a portion of the total air stream flowing through the duct. The sensor may be a conventional hot wire or other means as is known in the art. The conditioning device includes at least two opposed converging walls defining a nozzle, preferably a venturi, the sensor being disposed in the throat of the nozzle. The surfaces of the venturi walls are textured to create local cells of turbulence in the air boundary layer near the wall surface. Tripping the boundary layer flow into turbulence energizes the boundary layer and aids in maintaining attachment of flowing air to the walls even when the angle of attack of the air is significantly non-axial. The wall texturing may be random or may be an organized pattern. A currently preferred tripping pattern is a dimpled array similar to the surface of a golf ball. Keeping the boundary layer attached to the surface results in an effective throat area that does not change significantly with changes in the upstream flow field and angle of attack of incoming air to the air flow conditioner. Hence the flow profile through the throat and over the sensor remains similar to the profile produced with parallel walls and results in reduced sensitivity to variations in the upstream duct configurations.

A currently preferred embodiment comprises two venturis and sensors disposed in parallel, providing a two-sensor average output signal.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
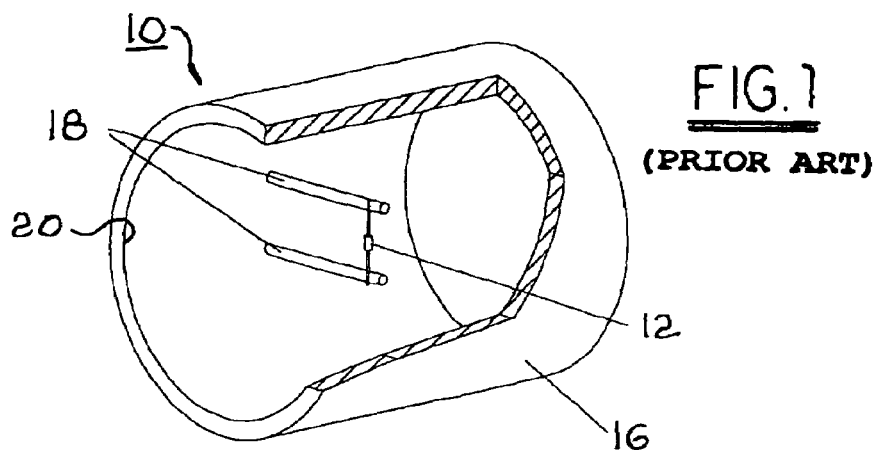
FIG. 1 is a cutaway isometric view of a prior art air flow rate sensor suspended centrally in a cylindrical duct.

Referring to FIG. 1, a first prior art air flow measurement system 10 includes a flow sensor 12 disposed in the interior of a cylindrical duct 16 for conveying air and attached by supports 18 to the interior wall 20 of duct 16. System 10 includes no upstream air flow conditioning means; thus sensor 12 samples only a tiny region of the cross-sectional area of duct 16 and is therefore highly sensitive to turbulent flow around the sensor, as may occur due to turbulence-generating changes in the upstream ducting (not shown in FIG. 1). Even if total flow rate remains fixed, any changes to the upstream ducting configuration can alter the flow field around the sensor and cause the sensor output to change. The air flow signal will then contain a degree of error.

Figure 2:
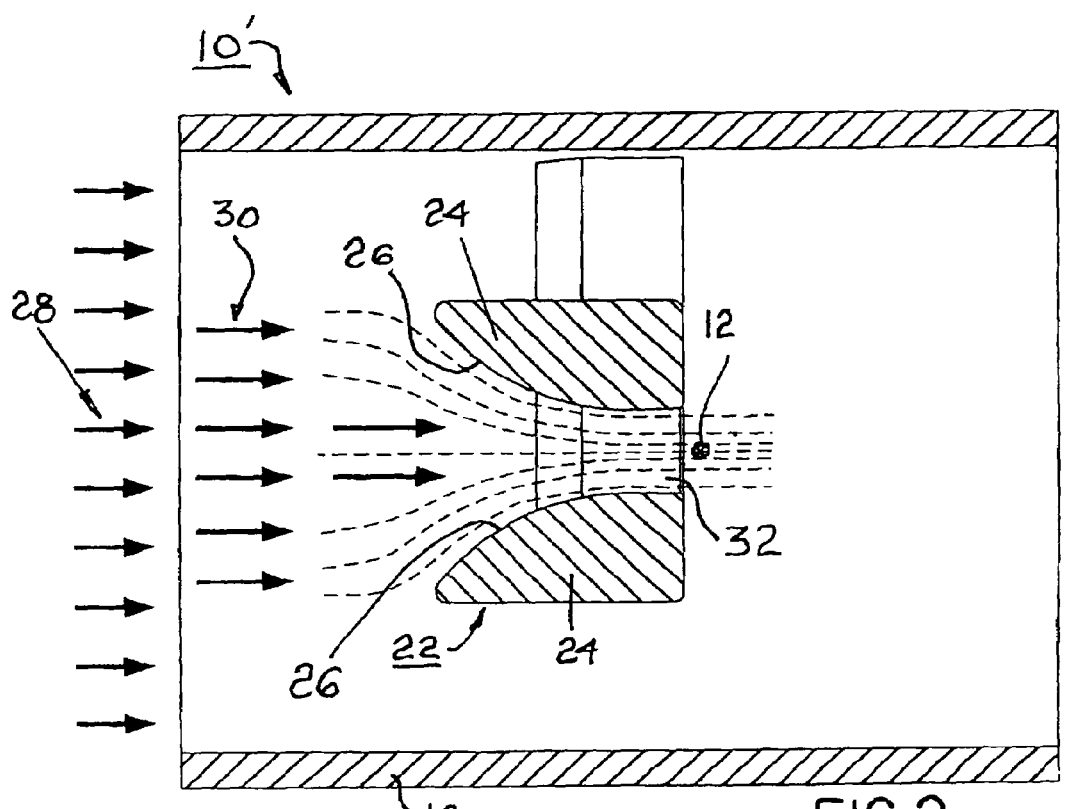
FIG. 2 is an elevational cross-sectional view of a prior art venturi air flow conditioning device disposed in a duct upstream of an air flow rate sensor, showing substantially laminar air flow axial of the duct.

Referring to FIG. 2, a second prior art air flow measurement system 10' includes a flow sensor 12 but also includes a venturi nozzle air flow conditioning device 22 disposed in duct 16 upstream of sensor 12. Device 22 includes opposed members 24 having walls 26 converging in the direction of air flow. A portion 30 of air 28 entering duct 16 is gathered by device 22 and funneled toward sensor 12 disposed at the exit to nozzle throat 32. System 10' thus samples and averages a much larger percentage of the flow cross-section than does system 10. Further, device 22 accelerates the air toward sensor 12, thus increasing the gain of the sensor.

Figure 3:
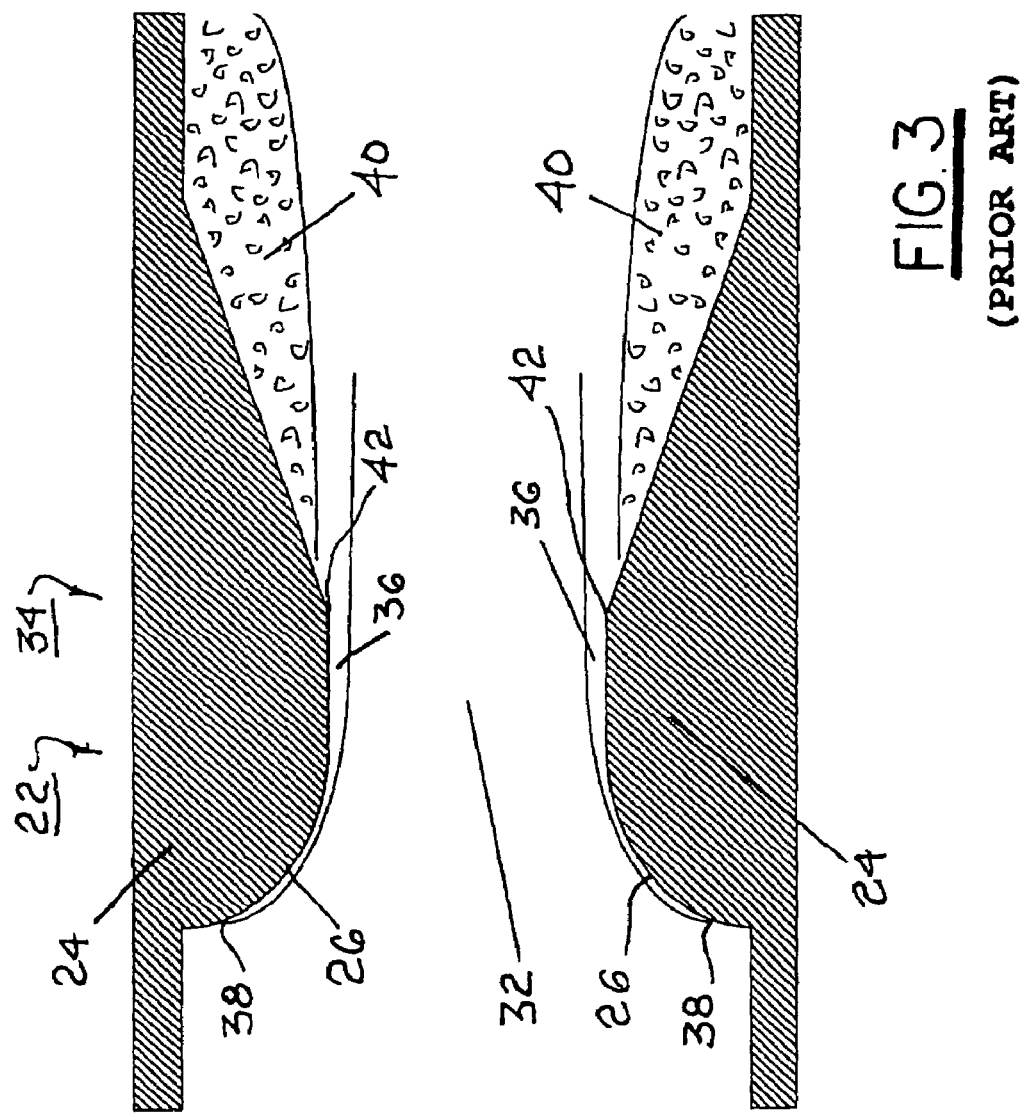
FIG. 3 is a schematic cross-sectional view of an exemplary prior art venturi air flow conditioning device, showing a wall boundary air layer and a flow separation region.

Referring to FIG. 3, when air flows through a venturi 34, a boundary layer 36 is formed along walls 26 beginning at a point 38 and extending into and through throat 32 to a flow separation region 40 beginning at a point 42. As discussed above, the shape and thickness of boundary layer 36 is a function of wall shape, flow velocity, and attack angle (direction of entering flow with respect to the wall surface). When the flow is essentially axial, as shown in FIGS. 2 and 3, boundary layers 36 are substantially identical on upper and lower wall surfaces 26.

Figure 4:
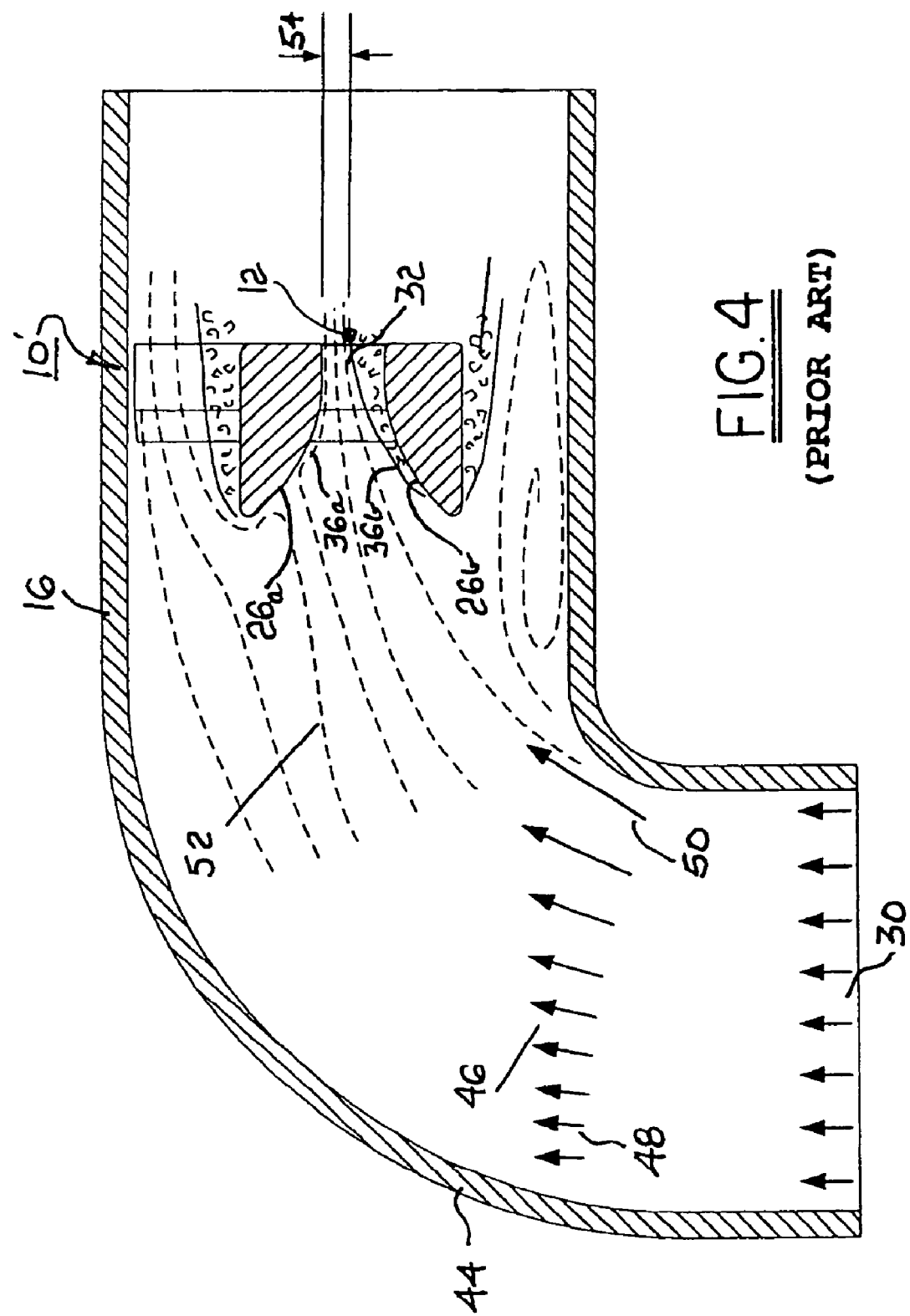
FIG. 4 is a view like that shown in FIG. 3, showing the effect of upstream turbulence and non-axial impingement in the asymmetric build-up of the boundary layer and consequent reduction in throat cross-sectional area.

Referring to FIG. 4, duct 16 is shown as having a 90° elbow portion 44 upstream of system 10'. Air portion 30 entering elbow 44 must turn 46 through a 90° angle. Severe turbulence is introduced into the air flow by such turning because air 48 flowing along the outside of the elbow flow path must travel a much longer path than air 50 flowing along the inside, resulting in generally non-axial flow of air 52 approaching device 10'. Because of a high attack angle on surface 26a and a correspondingly low attack angle on surface 26b, defining an asymmetric attack on both surfaces 26a, 26b, a thin boundary layer 36a is formed along surface 26a and a thick boundary layer 36b is formed along surface 26b. The result is that the diameter 54 of throat 32 is functionally reduced, thus reducing the volume of air flowing through throat 32 and hence altering the signal output of sensor 12.

Figure 5:
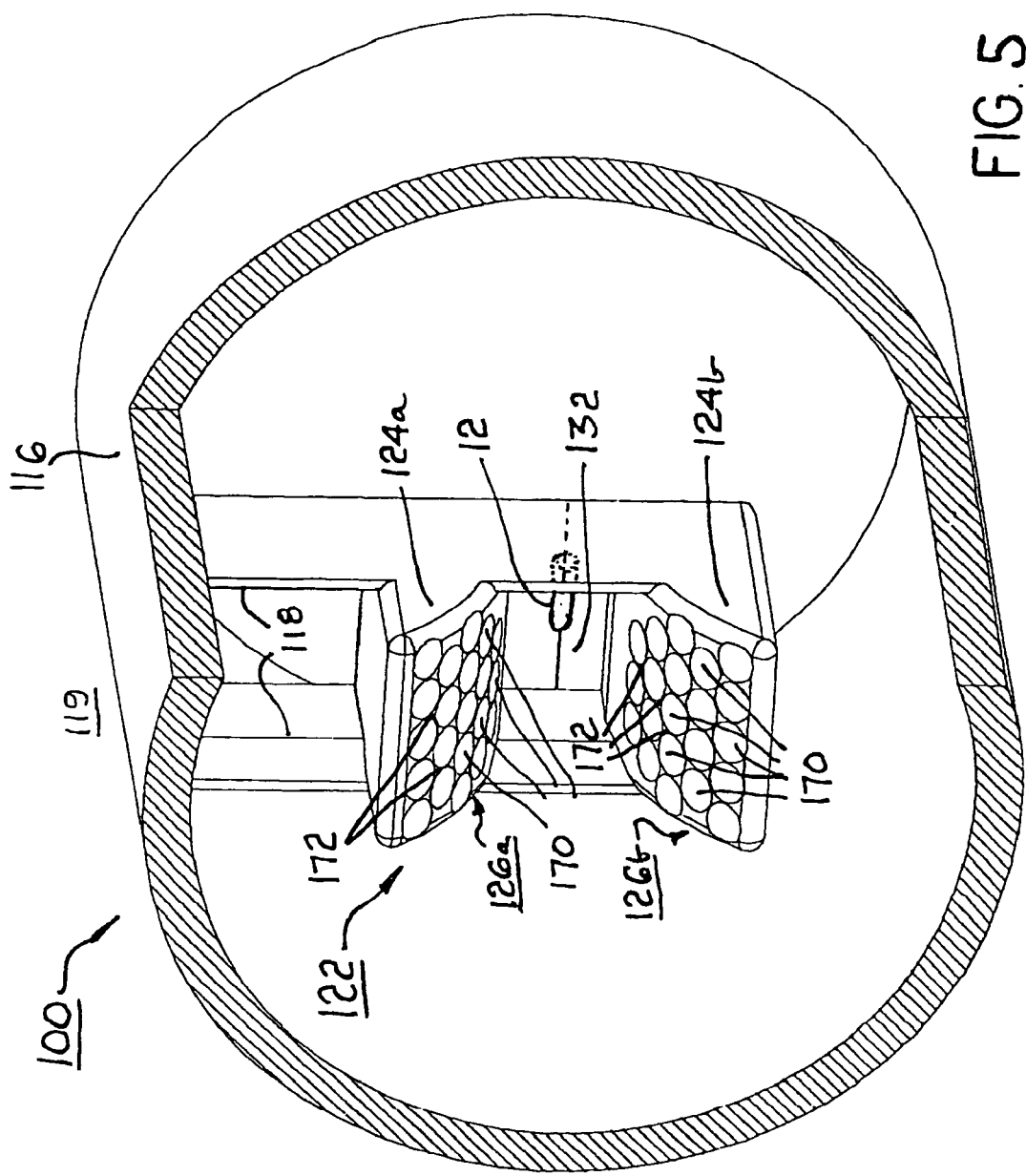
FIG. 5 is an isometric view of a first embodiment of an air flow conditioning device in accordance with the invention, showing a textured (dimpled) surface of the venturi walls.
Figure 6:
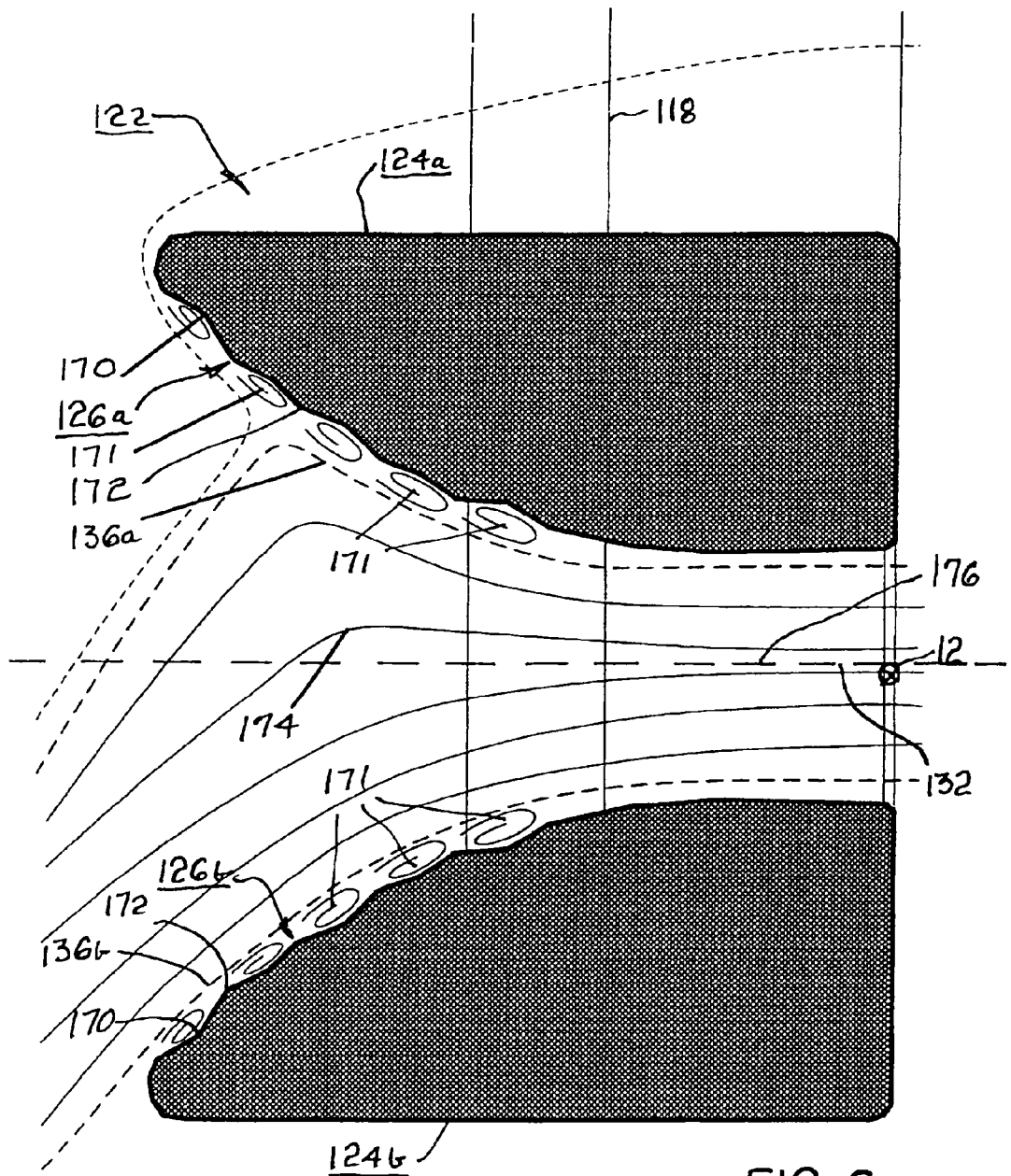
FIG. 6 is a cross-sectional view of the device shown in FIG. 5, showing air flow patterns when subjected to the conditions shown in FIG. 3.

Referring to FIGS. 5 and 6, an improved airflow measurement system 100 in accordance with the invention comprises a duct 116, a sensor 12, and a first embodiment 122 of an improved air flow conditioning device, also referred to herein as an air flow conditioner. Device 122 comprises first and second spaced apart members 124a, 124b suspended within duct 116 by supports 118. Duct 116 may be, for example, an intake air manifold of an internal combustion engine 119. Members 124a, 124b include opposed surfaces 126a, 126b which are convergent in the direction of air flow through duct 116 to define a throat 132 for receiving sensor 12. Convergent surfaces 126a, 126b may be planar (not shown) or preferably curved, as shown in FIGS. 5 and 6. Preferably, device 122 is a venturi.

Figure 7:
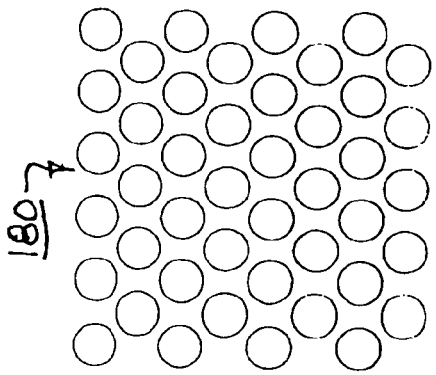
FIGS. 7 through 16 are views of various exemplary patterns for texturing of the venturi walls in accordance with the invention.
Figure 8:
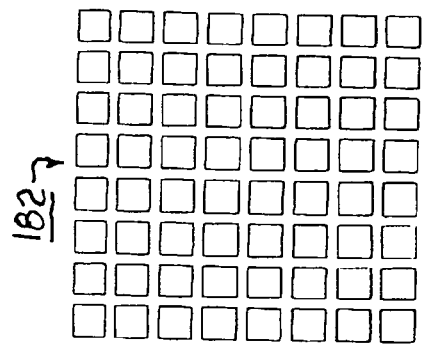
Figure 9:
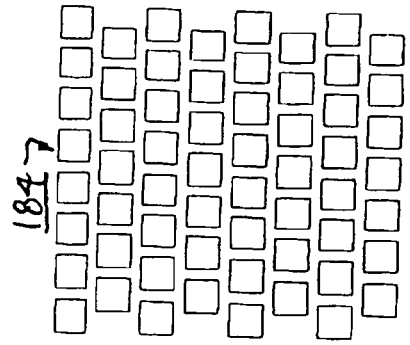
Figure 10:
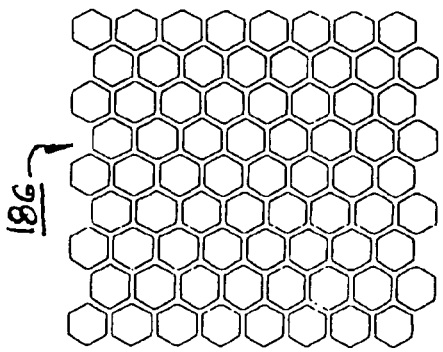
Figure 11:
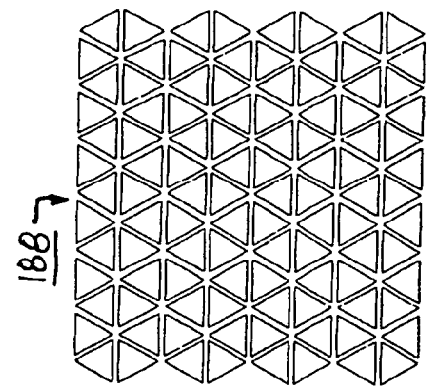
Figure 12:
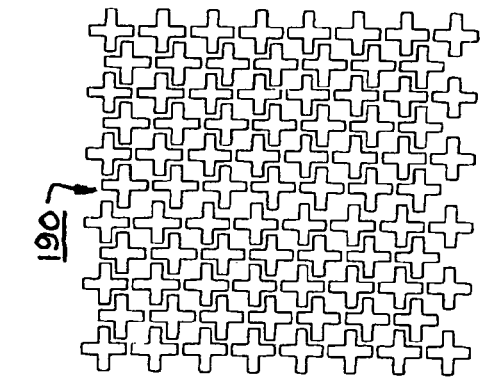

The converging regions of surfaces 126a, 126b are provided with a texture which may comprise a plurality of features 170 arranged in a pattern (FIG. 7), the features being separated by non-featured areas 172 of surfaces 126a, 126b. In a currently preferred embodiment, the features comprise shallow depressions, as shown in FIGS. 5 and 6, similar to the well-known dimples on a golf ball; alternatively, features 127 may comprise bumps (not shown) also separated by non-featured areas. In currently preferred embodiments, the rows of features are staggered to the left and right in the direction of air flow.

The following explanation, while currently believed by the inventors to be correct, should not be relied upon for patentability of the invention. It is believed that features 170 "trip" the flow in the boundary layer 136a, 136b from laminar to turbulent, forming eddies 171 along the surface and causing the boundary layer to remain attached along the entire surface of the nozzle into the throat. The boundary layer does not build up, as in the prior art, and does not variably occlude the nozzle throat. The flow 174 through the nozzle throat 132 remains almost parallel to the nozzle axis 176 despite the extreme non-axial angle of attack of the incoming air flow.

The currently-preferred pattern used to trip the flow to turbulent employs round dimples in a staggered pattern. Many other shapes and patterns will also accomplish the same effect.

Figure 14:
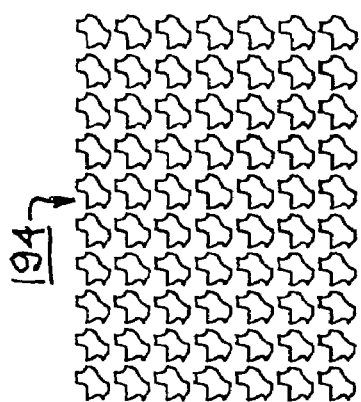
Figure 15:
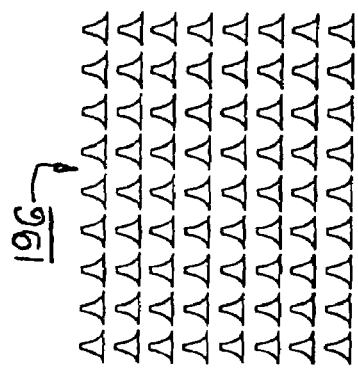
Figure 13:
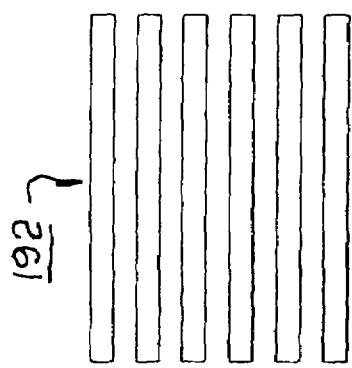
Figure 16:
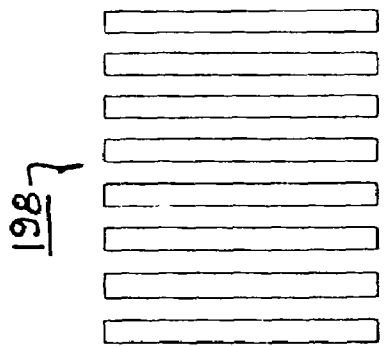

Referring to FIGS. 7 through 16, exemplary patterns in accordance with the invention are, respectively, staggered circles 180 (FIG. 7); aligned squares 182 (FIG. 8); staggered squares 184 (FIG. 9); hexagons 186 (FIG. 10); triangles 188 (FIG. 11); crosses 190 (FIG. 12); horizontal bars 192 (FIG. 13); arbitrary shapes 194 (FIG. 14); NACA duct shapes 196 (FIG. 15); and vertical bars 198 (FIG. 16). These shapes represent a small set of the many possible means for tripping the boundary layer flow to turbulent. The flow trips may include depressions and/or protrusions in/from the converging surfaces. The shapes may have any arbitrary outline. The pattern may have staggered, aligned, or random distribution. The pattern may be ordered or random (chaotic). The edges of the shapes may have sharp, square, rounded, or chamfered profiles. The cross-sections of the features may have flat, rounded, pointed or other profiles. Any form of surface roughness that trips the boundary layer flow into turbulence is comprehended by the invention.

Figure 17:
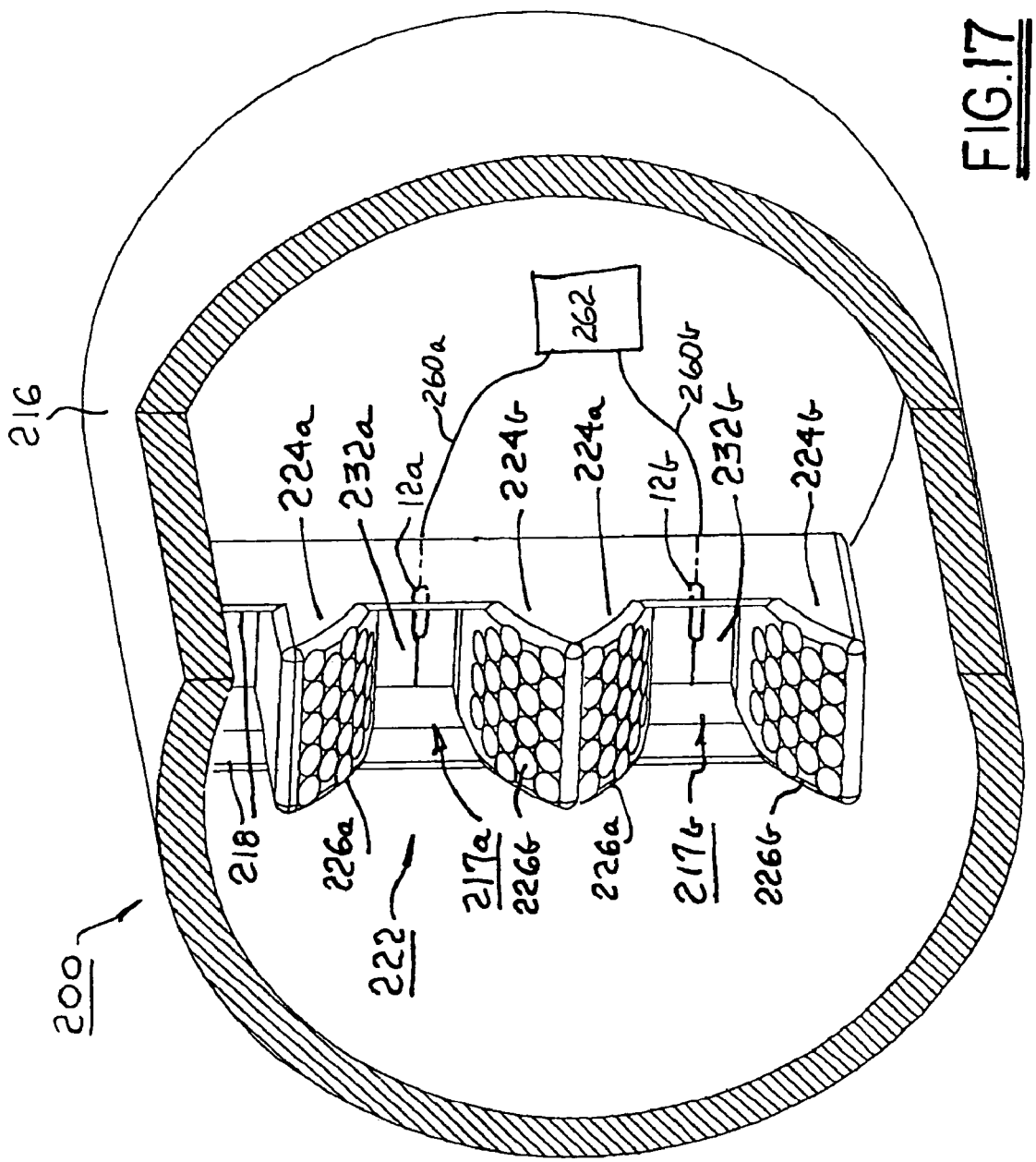
FIG. 17 is an isometric view of a second embodiment of an air flow conditioning device in accordance with the invention, showing two venturis in parallel.

Referring to FIG. 17, an improved air flow measurement system 200 in accordance with the invention comprises a duct 216, first and second sensors 12a, 12b, and a second embodiment 222 of an improved air flow conditioner. Device 222 comprises first and second nozzles 217a, 217b, each comprising first and second spaced apart members 224a, 224b suspended within duct 216 by supports 218. Nozzles 217a, 217b are disposed in parallel within duct 216; therefore, system 200 samples more of the total air flow than does system 100. Sensors 12a, 12b provide independent signals 260a, 260b which are averaged by a signal averaging mechanism 262 known in the art to further smooth the output signal over that provided by a single sensor as in embodiment 100 shown in FIG. 5. Members 224a, 224b include opposed surfaces 226a, 226b which are convergent in the direction of air flow through duct 216 to define throats 232a, 232b for receiving sensors 12a, 12b. Convergent surfaces 226a, 226b may be planar (not shown) or preferably curved, as shown in FIGS. 5 and 6. Preferably, nozzles 217a, 217b are venturis.

Referring to FIGS. 18 through 21, a performance comparison is shown between a prior art air flow measurement system in use currently in vehicles and an air flow measurement system in accordance with system 200.

Each system was tested by mounting the air flow conditioner and associated sensor in a test bed comprising a cylindrical duct, the duct being preceeded by a 90° elbow, generally as shown in FIG. 4, to generate substantial turbulence in the air flow through the duct. Further, the elbow was rotatably attached to the cylindrical duct such that air flow signals could be generated by the sensor at a plurality of angular positions of the elbow with respect to the duct. In this test, eight angular positions were used at 45° increments of rotation of the elbow around the axis of the duct; the positions are identified in FIGS. 18 through 21 as A through H. Further, the mass air flow through the test bed was varied incrementally at each angular position between 2 and 340 grams per second (g/sec).

Figure 18:
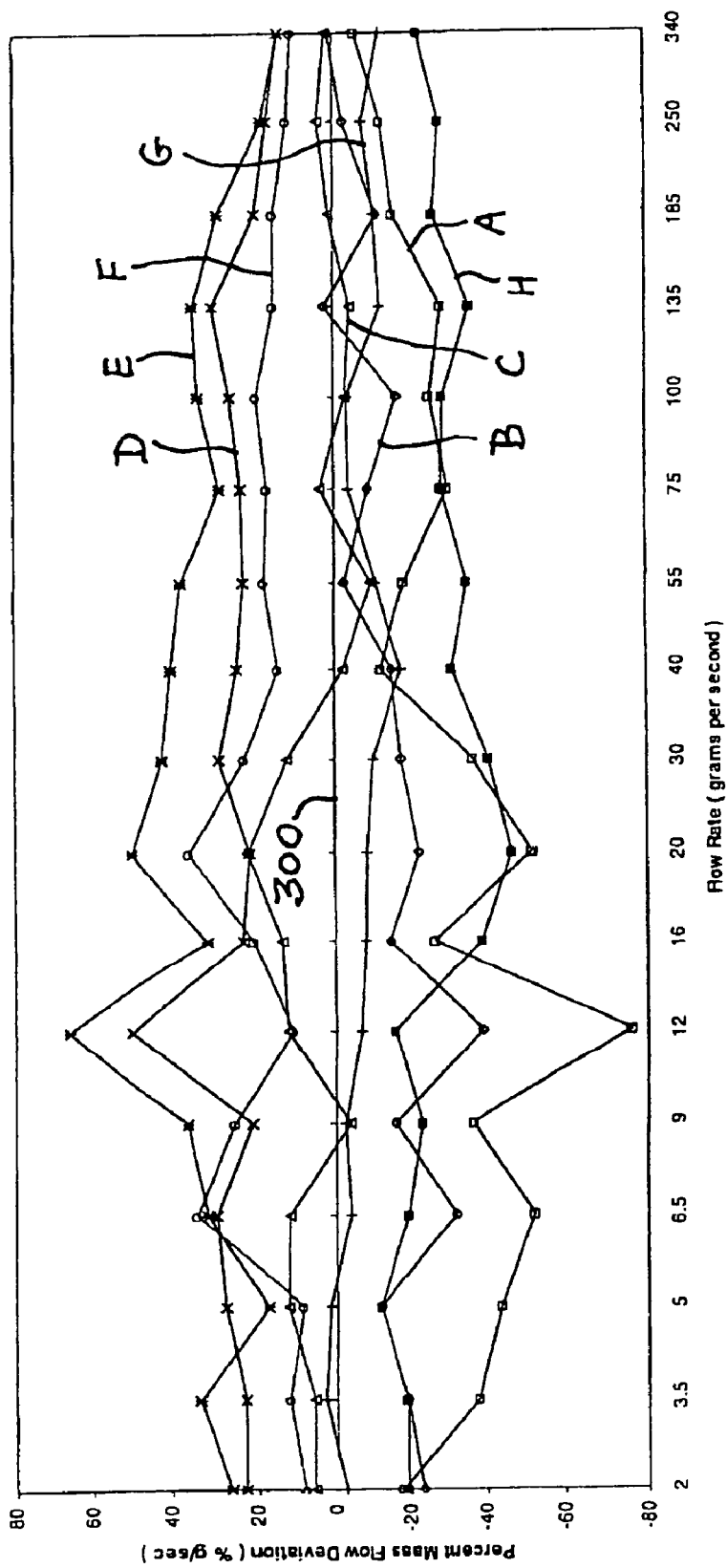
FIG. 18 is a graph showing mass flow deviation (error) as a function of air flow rate and angular orientation of an entrance elbow duct to a prior art air flow measurement apparatus.
Figure 19:
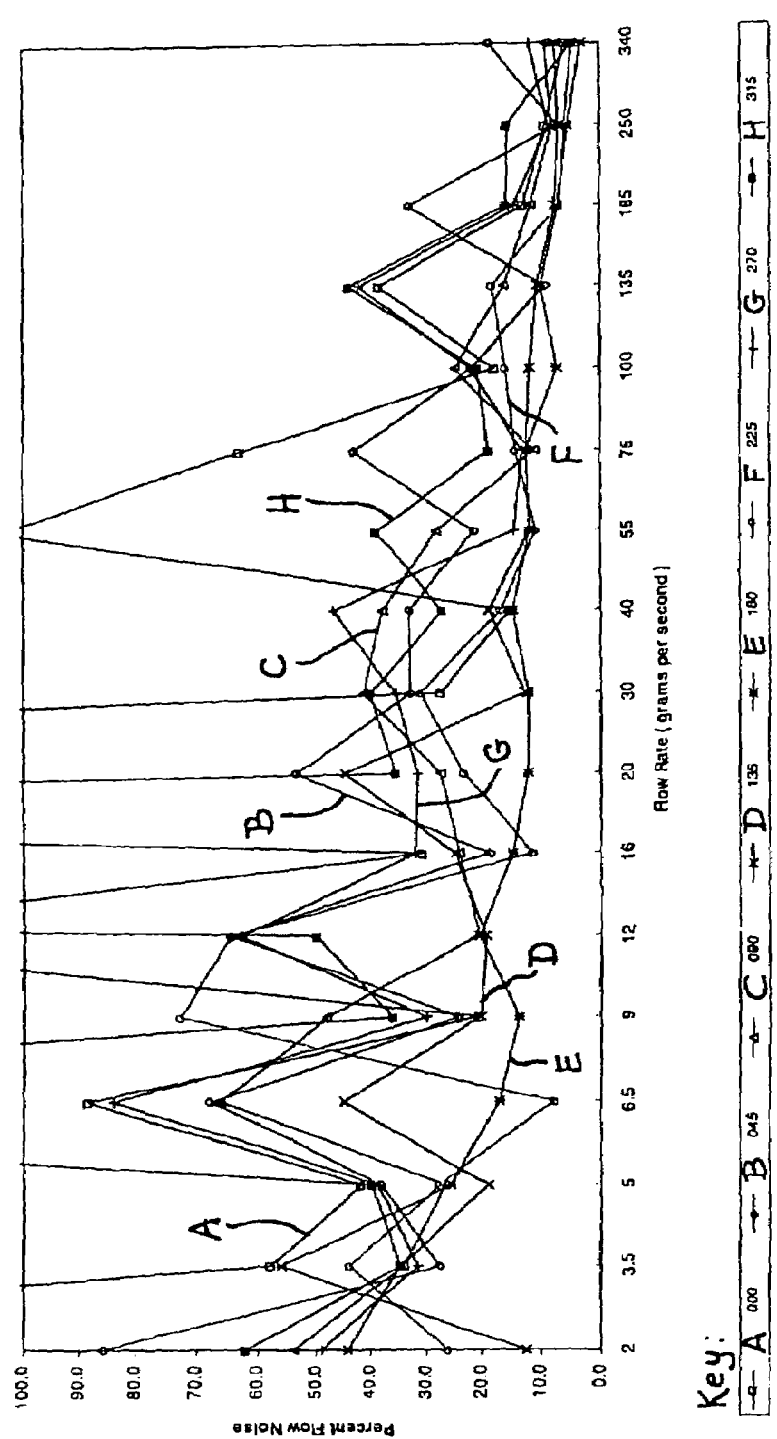
FIG. 19 is a graph showing noise levels in the average flow signals shown in FIG. 18.

Referring to FIGS. 18 and 19, it is seen that the prior art flow sensor was very sensitive to relative angle of the elbow to the duct. Positions A,B,C,H generally gave negative flow deviations from zero line 300 of up to about 50%, whereas positions D,E,F,G generally gave positive flow deviations of up to about 50% (FIG. 18). The deviations became only marginally less as flow rate increased. Further, the percent noise in the signal was extremely high (FIG. 19), being greater than 100% for a number of flows at elbow position A, and being generally between about 10% and 70% for the rest of the determinations. Clearly, this device is highly sensitive to turbulence in the air flow and epitomizes the problem that the present invention is intended to minimize.

Figure 20:
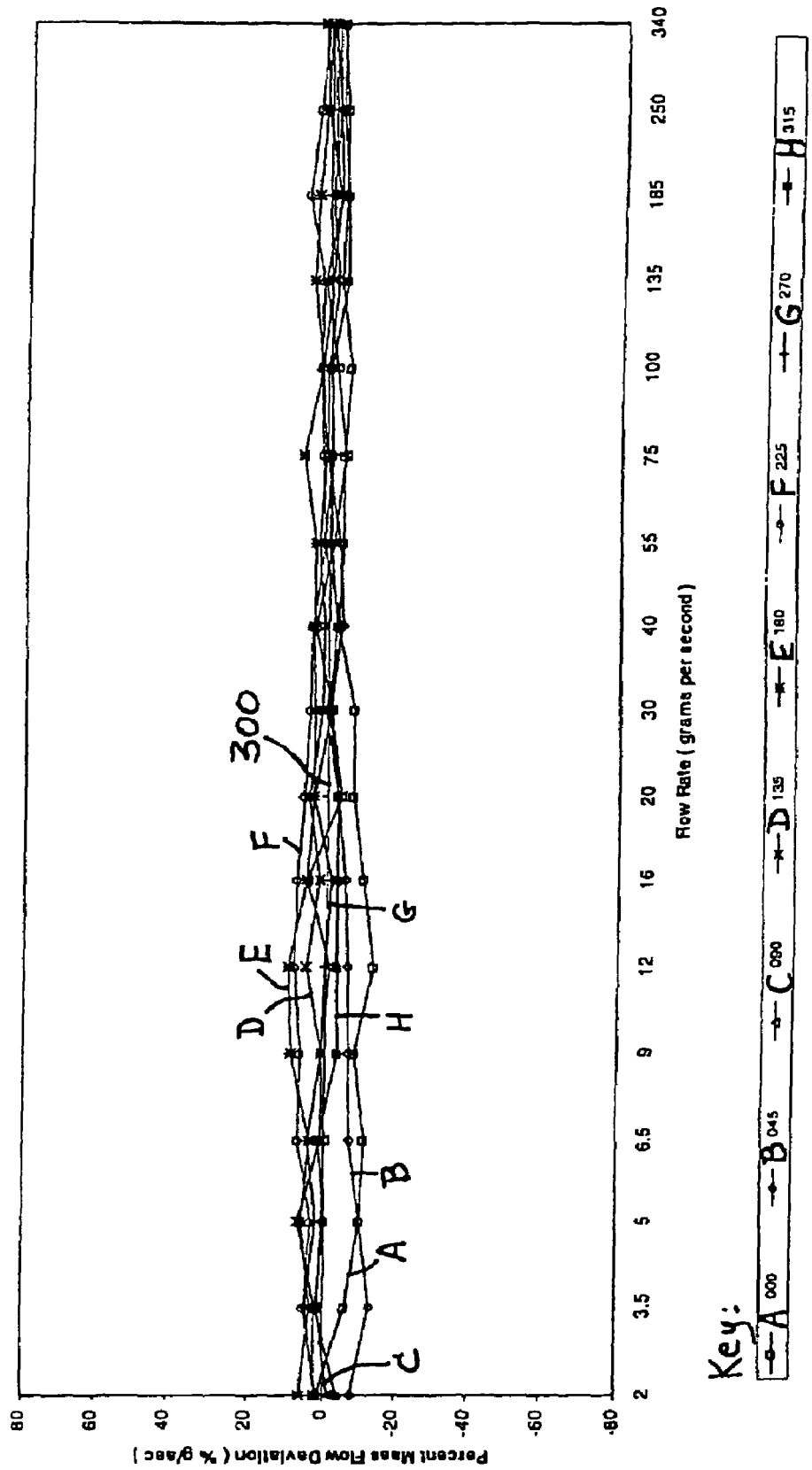
FIG. 20 is a graph like that shown in FIG. 18, showing results for an air flow measurement device in accordance with the invention when employing the air flow conditioner shown in FIG. 17.
Figure 21:
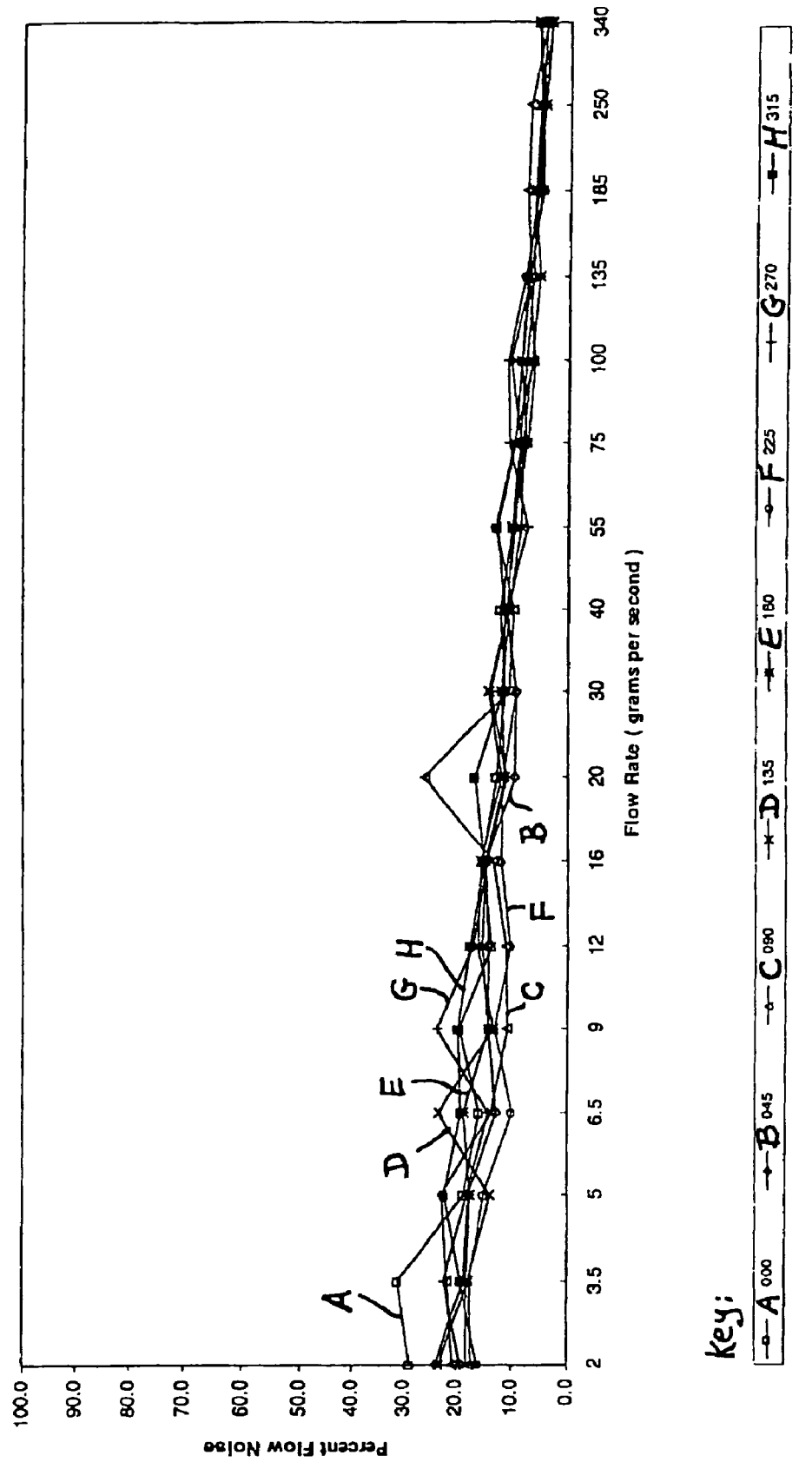
FIG. 21 is a graph showing noise levels in the average flow signals shown in FIG. 20.

Referring to FIGS. 20 and 21, under the identical test conditions, embodiment 200 in accordance with the invention showed a dramatic improvement. All flow deviations (FIG. 20) from zero line 300 were within +/−20%, and at flow rates above 40 g/sec all deviations were well within +/−10% with almost no systematic sensitivity to elbow position. Further, the signal noise was generally less than about 25% and at high flow rates was less than 10% (FIG. 21).

In a practical use application, the greater accuracy is, of course, higly desirable, but also important is the very large reduction in signal noise. A noisy signal will require a great many more sequential readings to determine a true average; thus, a low signal noise device can respond much more rapidly in providing accurate air flow signals to a user system.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. An air flow measurement system comprising
   an air flow conditioner including first and second walls convergent in the direction of air flow; and adapted to be inserted in a duct and
   an air flow sensor adjacent and downstream of said first and second walls for receiving air gathered by said convergence of said first and second walls to generate a first air flow measurement signal;
      wherein said first and second walls of said air flow conditioner comprise a surface characterized by a texture effective to produce a turbulent boundary layer about air flow to the air flow sensor.

2. An air flow measurement system in accordance with claim 1, wherein said texture comprises a plurality of features arranged in a pattern, wherein said features are selected from the group consisting of dimples, circles, squares, hexagons, triangles, crosses, arbitrary shapes, NACA duct shapes, vertical bars, and combinations thereof.

3. An air flow measurement system in accordance with claim 2 wherein said first and second convergent walls define a venturi.

4. An air flow measurement system in accordance with claim 2 further comprising third and fourth walls convergent in the direction of air flow.

5. An air flow measurement system in accordance with claim 4 wherein the surfaces of said third and fourth convergent walls are provided with a texture.

6. An air flow measurement system in accordance with claim 4 wherein said first and second convergent walls define a first venturi and said third and fourth convergent walls define a second venturi in parallel with said first venturi.

7. An air flow measurement system in accordance with claim 1, wherein said texture comprises a plurality of features arranged in a pattern, wherein said features are arranged in staggered rows.

8. An air flow measurement system in accordance with claim 7 wherein said first and second convergent walls define a venturi.

9. An air flow measurement system in accordance with claim 7 further comprising third and fourth walls convergent in the direction of air flow.

10. An air flow measurement system in accordance with claim 9 wherein the surfaces of said third and fourth convergent walls are provided with a texture.

11. An air flow measurement system in accordance with claim 9 wherein said first and second convergent walls define a first venturi and said third and fourth convergent walls define a second venturi in parallel with said first venturi.

12. An air flow measurement system for disposal in a stream of flowing air to measure the flow rate thereof, comprising:
 a) a first air flow conditioner including first and second walls convergent in the direction of air flow, wherein the surfaces of said walls are provided with a texture;
 b) a first air flow sensor adjacent said first and second walls for receiving air gathered by said convergence of said first and second walls to generate a first air flow measurement signal;
 c) a second air flow conditioner including third and fourth walls convergent in the direction of air flow wherein the surfaces of said third and fourth walls are provided with a texture; and
 d) a second air flow sensor adjacent said third and fourth walls for receiving air gathered by said convergence of said third and fourth walls to generate a second air flow measurement signal.

13. An air flow measurement system in accordance with claim 12 further comprising an averaging mechanism for averaging said first and second air flow measurement signals.

14. An air flow measurement system in accordance with claim 12 wherein said first and second walls and said third and fourth walls define first and second venturis, respectively, said first and second venturis being arranged in parallel in said stream of flowing air.

15. An internal combustion engine comprising an air flow measurement system for disposal in an intake manifold of said engine, wherein said air flow measurement system includes,
 a first air flow conditioner including first and second walls convergent in the direction of air flow, wherein the surfaces of said walls are provided with a texture,
 a first air flow sensor adjacent said first and second walls for receiving air gathered by said convergence of said first and second walls to generate a first air flow measurement signal,
 a second air flow conditioner including third and fourth walls convergent in the direction of air flow wherein the surfaces of said third and fourth walls are provided with a texture, and
 a second air flow sensor adjacent said third and fourth walls for receiving air gathered by said convergence of said third and fourth walls to generate a second air flow measurement signal.

* * * * *